US006856629B1

(12) United States Patent
Parsi et al.

(10) Patent No.: US 6,856,629 B1
(45) Date of Patent: Feb. 15, 2005

(54) FIXED ALGORITHM FOR CONCATENATION WIRING

(75) Inventors: Vahid Parsi, Richardson, TX (US); Robert A. Hall, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 924 days.

(21) Appl. No.: 09/609,577

(22) Filed: Jun. 30, 2000

Related U.S. Application Data

(60) Provisional application No. 60/211,815, filed on Jun. 15, 2000.

(51) Int. Cl.[7] .............................. H04J 3/04; H04L 12/28
(52) U.S. Cl. ....................................... 370/535; 370/907
(58) Field of Search ................................ 370/498, 532, 370/535, 536, 537–542, 507

(56) References Cited

U.S. PATENT DOCUMENTS

| | | | | |
|---|---|---|---|---|
| 5,260,934 A | * | 11/1993 | Tanaka et al. | 370/395.41 |
| 5,291,485 A | * | 3/1994 | Afify et al. | 370/537 |
| 5,319,484 A | * | 6/1994 | Jacob et al. | 370/535 |
| 5,369,653 A | * | 11/1994 | Kuroda | 370/907 |
| 5,490,142 A | * | 2/1996 | Hurlocker | 370/471 |
| 5,579,323 A | * | 11/1996 | Krisher | 370/537 |
| 5,682,257 A | * | 10/1997 | Uchida | 370/532 |
| 5,706,285 A | * | 1/1998 | Saijonmaa et al. | 370/391 |
| 5,710,774 A | * | 1/1998 | Suh et al. | 370/514 |
| 6,011,802 A | * | 1/2000 | Norman | 370/907 |
| 6,147,968 A | * | 11/2000 | De Moer et al. | 370/392 |

\* cited by examiner

Primary Examiner—Andy Lee
(74) Attorney, Agent, or Firm—Campbell Stephenson Ascolese LLP; Samuel G. Campbell, III

(57) ABSTRACT

A method and a communication circuit for directing control of communication signals in a concatenated payload in a communication circuit is disclosed. The method and apparatus includes receiving a multiplex order of the concatenated payload in M communication signals, dividing the M communication signals by three to determine a number Y, and determining the control of the M communication signals by designating the first signal of the M communication signals as a control signal, designating the second signal through a Yth signal of the M communication signals as being controlled by the immediately preceding signal thereto, and designating each Y+1th signal of the M signals through the Mth communication signal as being controlled by a signal Y positions prior thereto. The method and communication circuit includes communication signals that are synchronous transport signals. In an embodiment, the first signal of the M communication signals is a control signal read and write capability for frequency difference buffering using increment/decrement technology.

30 Claims, 10 Drawing Sheets

Key To

| A1 1502 | A2 1504 | J0 Z0 C 1506 | Payload Bytes 1590 |
|---|---|---|---|
| B1 1510 | E1 1512 | F1 1514 | Payload Bytes 1591 |
| D1 C 1520 | D2 C 1522 | D3 C 1524 | Payload Bytes 1592 |
| H1 1530 | H2 1532 | H3 1534 | Payload Bytes 1593 H4 1536 |
| B2 C 1540 | K1 C 1542 | K2 C 1544 | Payload Bytes 1594 |
| D4 C 1550 | D5 C 1551 | D6 C 1552 | Payload Bytes 1595 |
| D7 C 1553 | D8 C 1554 | D9 C 1555 | Payload Bytes 1596 |
| D10 C 1556 | D11 C 1557 | D12 C 1558 | Payload Bytes 1597 |
| S1 Z1 C 1570 | M1 Z2 C 1572 | E2 C 1574 | Payload Bytes 1598 |

SONET Frame 1500

FIG. 6

FIXED ALGORITHM FOR CONCATENATION WIRING

This application claims the benefit of provisional Patent Application No. 60/211,815 filed Jun. 15, 2000.

CROSS-REFERENCES TO RELATED APPLICATIONS

This application is related to patent application Ser. No. 09/477,166, filed Jan. 4, 2000, and entitled "METHOD AND APPARATUS FOR A REARRANGEABLY NON-BLOCKING SWITCHING MATRIX," having A. N. Saleh, D. E. Duschatko and L. B. Quibodeaux as inventors. This application is assigned to Cisco Technology, Inc., the assignee of the present invention, and is hereby incorporated by reference, in its entirety and for all purposes.

This application is related to patent application Ser. No. 09/232,395 now U.S. Pat. No. 6,724,757, filed Jan. 15, 1999, and entitled "A CONFIGURABLE NETWORK ROUTER," having H. M. Zadikian, A. N. Saleh, J. C. Adler, Z. Baghdasarian, and V. Parsi as inventors. This application is assigned to Cisco Technology, Inc., the assignee of the present invention, and is hereby incorporated by reference, in its entirety and for all purposes.

This application is related to U.S. Pat. No. 6,735,197 filed Jun. 30, 2000, and entitled "CONCATENATION DETECTION ACROSS MULTIPLE CHIPS," having Douglas E. Duschatko, Lane Byron Quibodeaux, Robert A. Hall, Andrew J. Thurston as inventors. This application is assigned to Cisco Technology, Inc., the assignee of the present invention, and is hereby incorporated by reference, in its entirety and for all purposes.

This application is related to patent application Ser. No. 09/607,912 filed Jun. 30, 2000, and entitled "PATH AIS INSERTION FOR CONCATENATED PAYLOADS ACROSS MULTIPLE PROCESSORS," having Douglas E. Duschatko, Lane Byron Quibodeaux, Robert A. Hall, Andrew J. Thurston as inventors. This application is assigned to Cisco Technology, Inc., the assignee of the present invention, and is hereby incorporated by reference, in its entirety and for all purposes.

This application is related to patent application Ser. No. 09/608,461 filed Jun. 30, 2000, and entitled "CHANNEL ORDERING FOR COMMUNICATION SIGNALS SPLIT FOR MATRIX SWITCHING," having Douglas E. Duschatko, Lane Byron Quibodeaux, Robert A. Hall, Andrew J. Thurston as inventors. This application is assigned to Cisco Technology, Inc., the assignee of the present invention, and is hereby incorporated by reference, in its entirety and for all purposes.

BACKGROUND OF THE INVENTION

1. Field of the Invention

The present invention relates to data communications, and, more particularly, efficiency in determining control signals in data communication circuits that include concatenated payloads.

2. Description of the Related Art

A data communications network is the interconnection of two or more communicating entities (i.e., data sources and/or sinks) over one or more data links. A data communications network allows communication between multiple communicating entities over one or more data communications links. High bandwidth applications supported by these networks include streaming video, streaming audio, and large aggregations of voice traffic. In the future, these demands are certain to increase. To meet such demands, an increasingly popular alternative is the use of lightwave communications carried over fiber optic cables. The use of lightwave communications provides several benefits, including high bandwidth, ease of installation, and capacity for future growth.

The synchronous optical network (SONET) protocol is among those protocols designed to employ an optical infrastructure and is widely employed in voice and data communications networks. SONET is a physical transmission vehicle capable of transmission speeds in the multi-gigabit range, and is defined by a set of electrical as well as optical standards.

In some networks, network nodes store data which they use for proper operation. In SONET, data between adjacent nodes are transmitted in modules called STS's (synchronous transport signals). Each STS is transmitted on a link at regular time intervals (for example, 125 microseconds). See GR-253 (GR-253: *Synchronous Optical Network (SONET) Transport Systems*, Common Generic Criteria, Issue 2 [Bellcore, December 1995] (hereinafter referred to as GR-253 Specification) incorporated herein by reference for all purposes. An STS-1 is a Synchronous Transport Signal-level 1 is the basic module in SONET and is defined as a specific sequence of 810 bytes (6480 bits) including overhead bytes and an envelope capacity for transporting payloads. In general, the higher-level signals, the STS-N signals, are lower-level modules that are multiplexed together and converted to an OC-N or STS-N signal. An STS-N frame is a sequence of N×810 bytes wherein N is a predetermined number. An STS-N is formed by byte-interleaving of STS-1 and STS-M modules, wherein M is less than N.

In some systems, such as certain ISDN and ATM systems, multiple STS-1 payloads are transported as super rate payloads. To accommodate such a payload an STS-Nc module is formed by linking N constituent STS-1s together in fixed phase alignment. The payload is then mapped into a single STS-Nc Synchronous Payload Envelope (SPE) for transport. Network equipment supporting the multiplexing, switching or transport of STS-Nc SPES treat an STS-Nc SPE as a single entity. When an STS-Nc SPE is treated as a single entity, concatenation indicators are present in the second through the Nth STS payload pointers which show that the STS-1s in the STS-Nc are linked together.

STS-Ncs can exist in many different combinations in an STS-M payload. One problem with concatenated STS signals includes connecting an combination of STS-Ncs within an STS-M payload in a manner that is a working combination of STS-Ncs.

Furthermore, an efficient method of connecting multiple STS-1s in an STS-M payload is needed.

SUMMARY OF THE INVENTION

Accordingly, a method for connecting STS-1s in an STS-M payload provides a fixed formula for connecting any permissible combination of STS-Nc in a multiple STS payload.

According to an embodiment of the invention, a method and apparatus for hookup STS-1s for routing of control signals includes designating a step size, Y as an STS step size, designating a size of a total STS payload as M, and designating the Y STS step size as M divided by three. Further the method includes, for a first set of Y channels other than a first channel, in the multiple STS payload, designating a previous channel as a control channel, and for a second set of Y channels, designating control signals for each channel within the second set of Y channels as a channel Y positions before the given channel.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 6 illustrates a standard frame of the synchronous optical network protocol.

The use of the same reference symbols in different drawings indicates identical items unless otherwise indicated.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

In addition, the division of the detailed description into separate sections is merely done as an aid to understanding and is in no way intended to be limiting.

An Exemplary Network Element

Figure 1A:
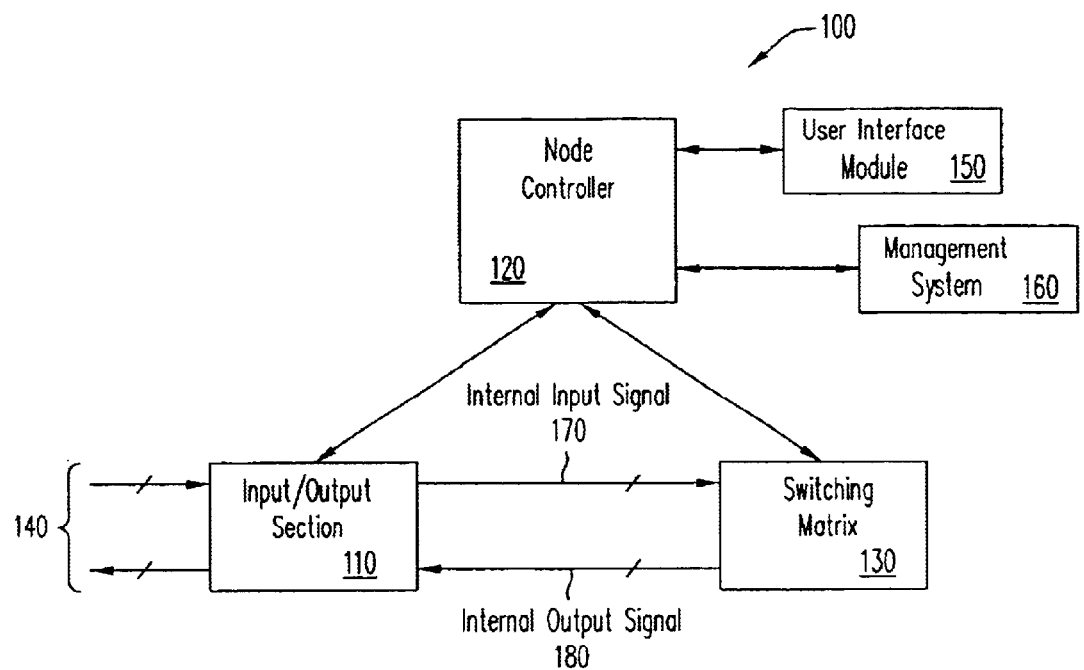
FIG. 1A is a block diagram of an exemplary router.

FIG. 1A illustrates a router 100. Router 100 includes an input/output section 110, a node controller 120, and a switching matrix 130. Node controller 120 contains, for example, real time software and intelligent routing protocols (not shown). Router 100 supports interfaces including, but not limited to, optical signal interfaces (e.g., SONET), a user interface module 150, and a management system 160. Internal input signals 170 and internal output signals 180 may be electrical or optical in nature.

Figure 1B:
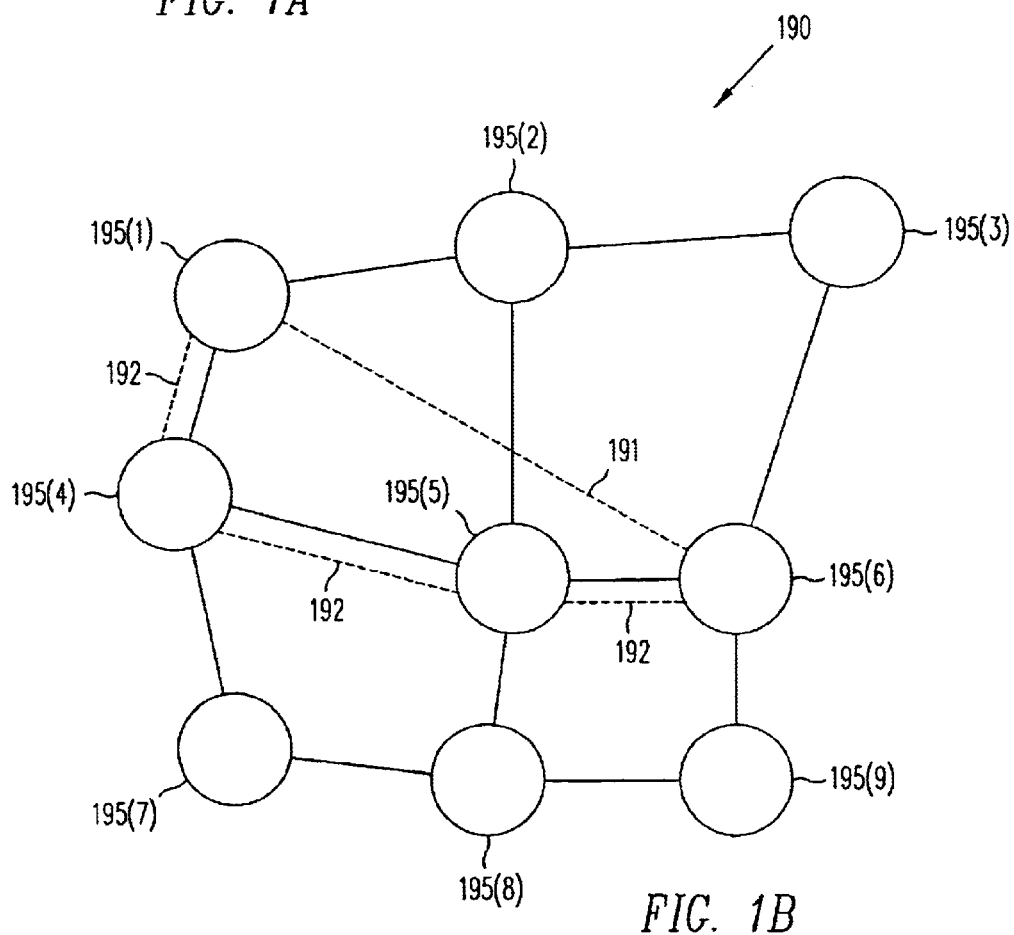
FIG. 1B is a block diagram of a network including a number of the routers of FIG. 1A.

FIG. 1B illustrates a network 190 that includes a number of nodes, network nodes 195(1)–(N). One or more of network nodes 195(1)–(N) can be a router such as router 100. Network 190 can thus support the automatic provisioning, testing, restoration, and termination of virtual paths (exemplified by a virtual path 191) over a physical path (exemplified by a physical path 192) from one of network nodes 195(1)–(N) to another of network nodes 195(1)–(N).

In one embodiment, there are at least three types of processors in a router 100. The lowest level, level-3, resides on the line card and is responsible for all real time aspects of the processing of the physical protocol (e.g., SONET). In a SONET implementation, every level-3 processor is responsible for a single optical signal (e.g., an OC48 signal) and, via a protocol processor, performs all required SONET/SDH section and line termination functions. The fast response time required from the level-3 processor makes a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, level-2, reside on a shelf and main matrix processor modules. The software on the shelf processor module is responsible for managing and controlling line cards. Only half the line cards supported are active at any one time in order to support 1+1 protection. A level-2 processor deals with tasks that require a reasonable response time (for example, on the order of milliseconds), but have no direct impact on the data path. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are preferably two fully synchronous copies of the level-1 processor in the system, both of which are simultaneously active and, through a dedicated and redundant high-speed link, keep their run-time and stored databases fully synchronized. One of the two processors is designated the master and is responsible for all level-1 processing. An update message is sent to the second processor whenever a change is made to the database and before that change is effected. A periodic keep-alive mechanism allows either copy of the system controller to detect failures on the other copy.

Router 100 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

Hardware Architecture

In one embodiment, router 100 can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N). Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Signal Path

Figure 2:
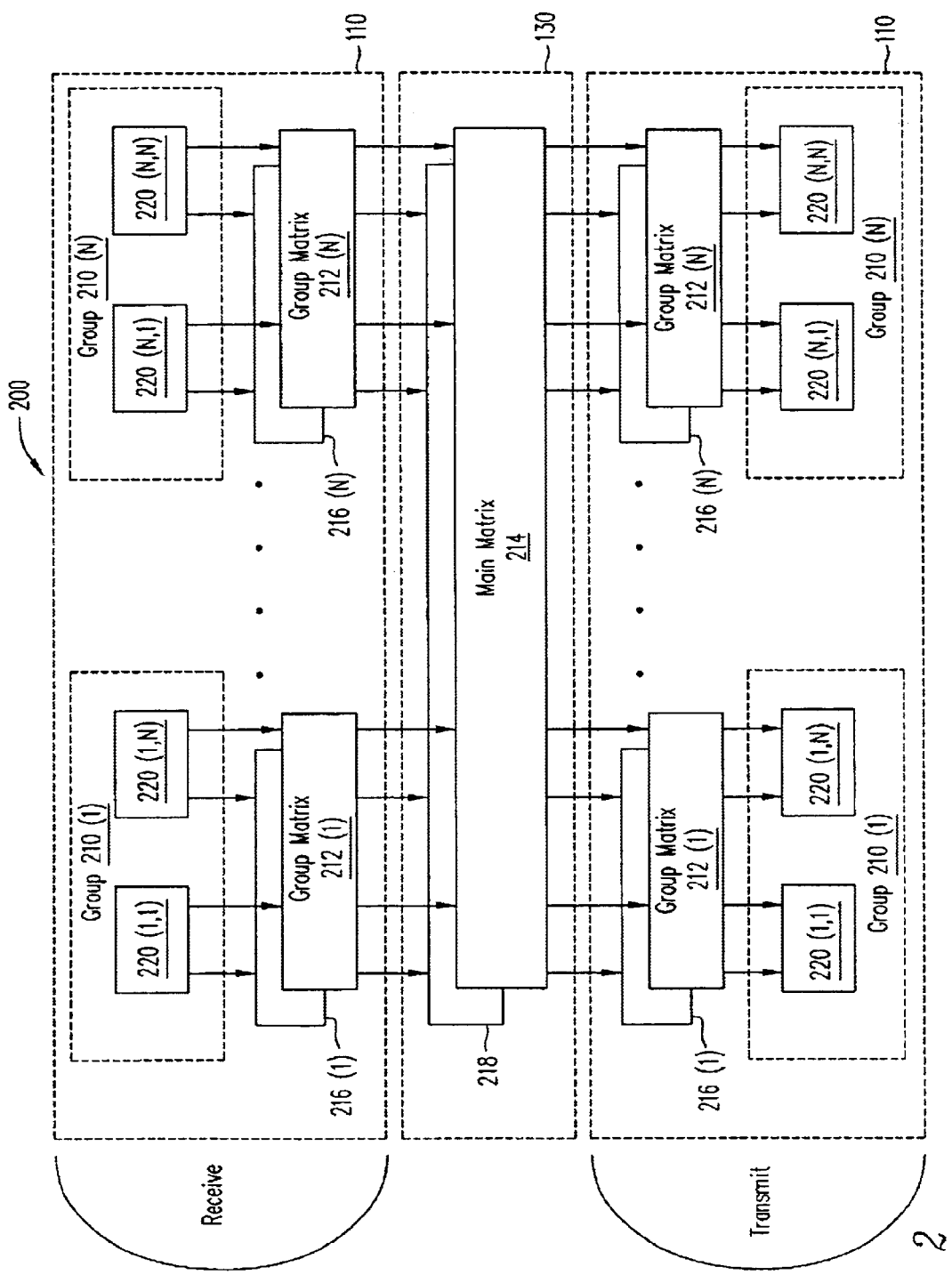
FIG. 2 is a block diagram of the signal paths and functional blocks of the router of FIG. 1A.

FIG. 2 is a block diagram of signal paths 200 within router 100. The primary signal paths in router 100 include one or more groups exemplified by groups 210(1)–(N), group matrices 212(1)–(N), and a main matrix 214. As depicted in FIG. 1A, groups 210(1)–(N), and group matrices 212(1)–(N) are shown as having receive and transmit sections. Groups 210(1)–(N) each include line cards 220(1,1)–(1,N), through line cards 220(N,1)–(N,N). Signals from line cards 220(1,1)–(N,N) are sent to the corresponding group matrix. In one embodiment, two sets of the group matrix cards, group matrices 212(1)–(N) and 216(1)–(N) are employed. Main matrix 214 is also mirrored in one embodiment by a redundant copy, a backup main matrix 218, which together form switching matrix 130. As shown in FIG. 2, the redundancy for group matrices 212(1)–(N) (i.e., group matrices 216(1)–(N)), is also provided on the transmit side.

It will be noted that the variable identifier "N" is used in several instances in FIG. 2 (and subsequent use of other variables, such as "m," "x," "k," and others) to more simply designate the final element (e.g., group matrix 212(N), line card 220(N,N), and so on) of a series of related or similar elements (e.g., group matrices 212(1)–(N), line cards 220 (1,1)–(N,N), and so on). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "N" (or "m," "x," "k," and others) may hold the same or a different value than other instances of the same variable identifier. For example, group matrix 212(N) may be the tenth group matrix in a series of group matrices, whereas line card 220(N,N) may be the forty-eighth line card in a series of line cards.

Using signal paths 200 as an example, data enters the system at one of line cards 220(1,1)–(N,N). It is at this point, in a SONET-based system, that the Section and Line overheads are processed and stripped off by a protocol processor (not shown). The extracted SONET/SDH payload envelope is then synchronized with the system clock and sent to two different copies of a local matrix, depicted as group matrices 212(1)–(N) and 216(1)–(N) in FIG. 1A. In one embodiment, group matrices 212(1)–(N) and 216(1)–(N) are used mainly as 2:1 reduction stages that select one of two optical signals and pass the selected optical signal to switching matrix 130. This allows the implementation of a variety of protection schemes (including 1:N, or 0:1) without having to use any additional ports on main matrix 214. All protect signals are terminated at group matrices 212(1)–(N) and 216(1)–(N). In order to maximize bandwidth, it is preferable that only active signals be passed through to switching matrix 130.

In one embodiment, switching matrix 130 is an errorless, rearrangeably non-blocking switching network. In one embodiment, switching matrix 130 is a 256×256 switching network that consists of three columns and 16 rows of 16×16 switching elements that allow any of their inputs to be connected to any of their outputs. A single copy of the matrix may be housed, for example, in a single rack that contains three shelves, one for each column (or stage) of the matrix. Each one of such shelves contains cards housing the 16 switching elements in each stage. The switching element itself includes, for example, a 16×16 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors.

The switching elements in each matrix copy of the exemplary embodiment may be connected using fiber-optic cables, for example. While copper cabling may also be employed, such an option may not offer the speed and number of connections provided by an optical arrangement. After passing through the stages of switching matrix 130, an optical signal may be routed to an I/O shelf that (optionally) splits the optical signal into two signals. One of the signals is sent to an active line card, while the other, when available, is sent to a backup card.

Line cards 220(1,1)–(N,N) receive optical signals from group matrices 212(1)–(N) and 216 (1)–(N) which are in turn connected to two separate copies of the main matrix. Line cards 220(1,1)–(N,N) monitor both signals for errors and, after a user-defined integration period, switch to the backup signal if that signal exhibits better bit error rate (BER) performance than the prior active signal. This scheme, referred to herein as 1-plus-1, allows line cards 220(1,1)–(N,N) to select between the two copies of the group matrix without any level-1 or level-2 CPU intervention. This helps to ensure that such a switch can be made in 50 ms or less (per Bellcore's recommendations in GR-253 (GR-253: *Synchronous Optical Network* (*SONET*) *Transport Systems*, Common Generic Criteria, Issue 2 [Bellcore, December 1995], included herein by reference, in its entirety and for all purposes)). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Control Path

Figure 3:
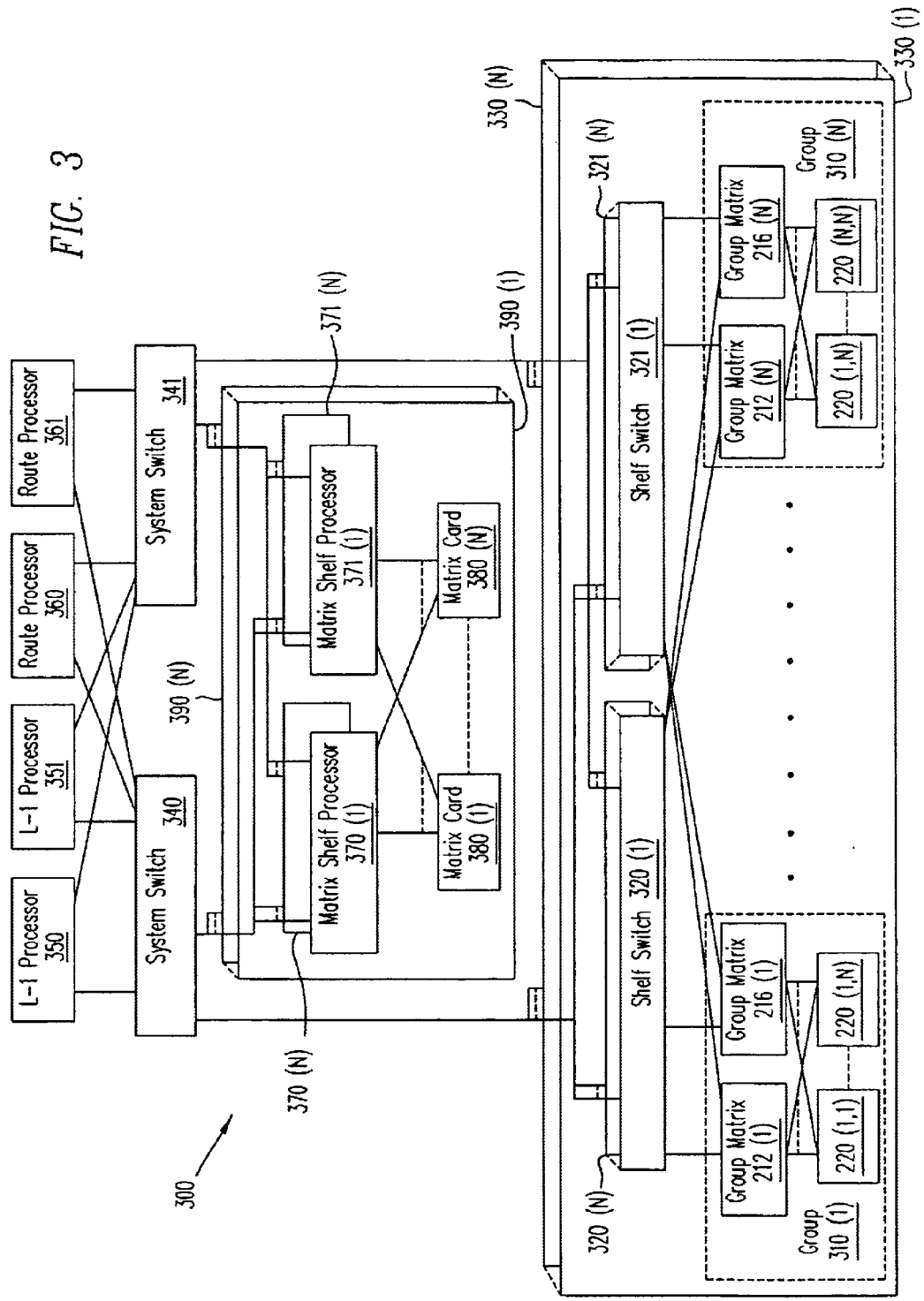
FIG. 3 is a block diagram of the control paths of the router of FIG. 1A.

FIG. 3 illustrates a control path 300 of a router, such as router 100. Control path 300 includes all non-payload-related flows within the system and the hardware and software necessary to the control of the signal paths illustrated in FIG. 2. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

Groups

At the bottom of the hierarchy is what is referred to herein as a group matrix, or a Group Ethernet Repeater in a system using Ethernet communications, and depicted in FIG. 3 as group matrices 212(1)–(N) and 216(1)–(N). Each one of group matrices 212(1)–(N) and 216(1)–(N), also referred to herein as a hub, a repeater, or concentrator, is a physical layer device and preferably supports a star network topology, such as the IEEE 802.3 10BASE-T networking standard. The redundant connections from line cards 220(1,1)–(N,N) in each of groups 310(1)–(N) are connected to two repeaters that reside on two separate copies of the group matrix module. Preferably, each one of line cards 220(1,1)–(N,N) supports two network ports (e.g., 10BASE-T Ethernet ports). The two sets of four signals from each port pass through a relay that selects one of them for connection to the LAN for purposes of redundancy. Groups 310(1)–(N) represent the first layer of the control bus hierarchy. Group matrices 212(1)–(N) and 216(1)–(N) are each controlled by a shelf processor (not shown, for the sake of clarity) and communicate with one of the shelf switches described below via LAN connections.

Shelf Ethernet Switch

FIG. 3 also illustrates certain features of router 100 pertaining to the relationship between shelf switches 320(1)–(N) and 321(1)–(N), and groups 310(1)–(N). Groups 310(1)–(N) are again shown, with regard to the control functions thereof. In this depiction of groups 310(1)–(N), line cards 220(1)–(N,N) are shown as being attached to networking devices, indicated here as group matrices. Group matrices 212(1)–(N) and 216(1)–(N) may be, for example, multi-port Ethernet hubs running at 10 Mbps. Each of line cards 220(1)–(N,N) feed signals into two of group matrices 212(1)–(N) and 216(1)–(N). For example, line card 220(1,1) feeds received information to group matrices 212(1) and 216(1). Group matrices 212(1)–(N) and 216(1)–(N) each feed a signal into shelf switches 320(1)–(N) and 321(1)–(N) of FIG. 2. Shelf switches 320(1)–(N) and 321(1)–(N) are each controlled by a shelf processor (not shown for the sake of clarity) and communicate with one of the system switches (not shown, for the sake of clarity).

Shelf switches 320(1)–(N) and 321(1)–(N) are the next higher level of the control hierarchy in router 100, and are located on the shelf processor module (exemplified by line racks (330(1)–(N)). Each copy of shelf switches 320 (1)–(N) and 321(1)–(N) interconnects six connections from the three groups in each shelf, another connection from the shelf processor, and one connection from system switch 340 (and 341). Shelf switches 320(1)–(N) and 321(1)–(N) can be implemented, for example, using an 8-port Ethernet configured to handle 10 Mbps Ethernet traffic and a single-port, dual-rate switch (e.g., 10 Mbps/100 Mbps Ethernet).

System Switch

The next level of the hierarchy is the system switch, of which there are two copies in each router. These are shown as system switches 340 and 341 in FIG. 3. This fully redundant scheme prevents failures on one switch from taking down the entire control bus. In one embodiment, a system switch manages connections from the following sources:

1. High-speed connection(s) from shelf switches 320(1)–(N) and 321(1)–(N);
2. High-speed connection(s) to higher-level processors (e.g., redundant level-1 processors 350 and 351, and redundant route processors 360 and 361); and
3. High-speed connection(s) to matrix shelf processors 370(1)–(N) and 371(1)–(N) which, in turn, control matrix cards 380(1,1)–(1,N)), located in main matrix racks 390(1)–(N).

It will be noted that main matrix 214 includes matrix cards 380(1,1)–(1,N), and that, more generally, main matrices 214 and 218 are included matrix racks 390(1)–(N).

System switches 340 and 341 are located in a management bay. As noted, the fully redundant switches manage connections from various router elements, such as I/O and matrix bays, level-1 processors, and route processors. Each of level-1 processors 350 and 351 and route processors 360 and 361 is preferably connected to system switches 340 and 341 using 100 Mbps Ethernet connections in a configuration that creates an expandable, efficient, and fully redundant control bus.

Physical Configurations and Modules

System Modules

Line Card

Figure 4:
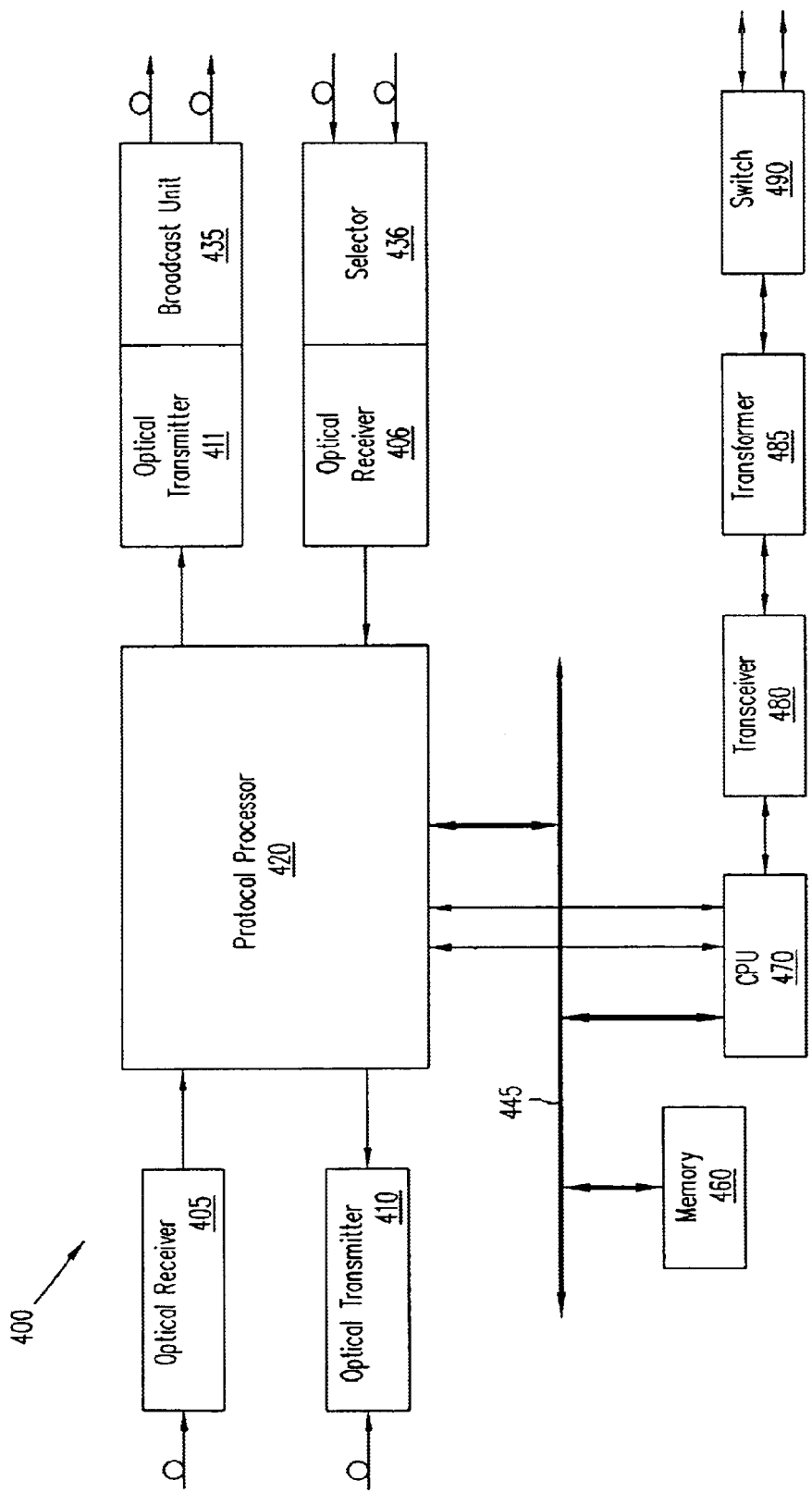
FIG. 4 illustrates the major components of one of the line cards.

FIG. 4 illustrates the major components of one of line cards 220(1,1)–(N,N), exemplified in FIG. 4 by a line card 400. A line card integrates all the necessary hardware and software functions to properly terminate the physical layer. In a SONET implementation, a line card terminates the transport overhead (Section+Line) of a full duplex OC-48 signal. Other components on this card provide a redundant optical connection to the switch matrix, and a communication channel to other modules in the system.

Line card 400 receives optical signals from other network elements via a line-side optical receiver 405 and from the local router's system via a system-side optical receiver 406. Each of these receivers implements an optical-to-electrical (O/E) conversion function. Line card 400 transmits optical signals to other network elements using a line-side optical transmitter 410 and to the group matrices using a system-side optical transmitter 411. Each of these transmitters implements an electrical-to-optical (E/O) conversion function. It will be noted that line-side refers to the side of the line card coupled to other network elements and system-side refers to the side of the line card coupled to the group matrices.

Line-side optical receiver 405 is coupled to a protocol processor 420 which performs clock recovery multiplexing, demultiplexing, and SONET STE/LTE processing in both directions. Similarly, system-side optical receiver 406 is also coupled to protocol processor 420 to allow protocol processor 420 to receive optical signals. The processed electrical signals from protocol processor 420 are coupled to the transmitters 410 and 411. The clock recovery functions are combined with demultiplexers and multiplexers to support reception and transmission of the optical data, respectively. The multiplexers serialize output data generated in protocol processor 420 by performing parallel-to-serial conversion on the parallel data. In contrast, de-multiplexers are used in protocol processor 420 to perform serial-to-parallel conversion on received data.

In order to add protection channels, line-side optical transmitter 410 is also coupled to a 1:2 broadcast unit 435. To receive such optical signals, optical receiver 406 is also coupled to a 2:1 selector 436 in order to select the working channel before the optical signals leave the shelf and thus prevent the standby channel (also referred to herein as the protect channel) from using any bandwidth on switching matrix 130.

Protocol processor 420 is coupled to a bus 445. Protocol processor 420 interfaces the line card to two copies of the matrix in a 1+1 physical protocol. In a SONET implementation, protocol processor 420 provides both STE/LTE processing according to published industry standards. Also coupled to bus 445 are a memory 460 and a CPU 470. Memory 460 should be fast enough for efficient operation of CPU 470.

CPU 470 communicates with other of line cards 220(1,1)–(N,N) over a control bus (not shown) using a transceiver 480 that is coupled to CPU 470. Transceiver 480, is coupled to a transformer 485 which is coupled to a switch 490. Switch 490 is coupled to the control bus. Switch 490 implements a 1:1 protection scheme for transceiver 480 and couples CPU 470 to two independent ports on the backplane (not shown). Each of the two ports connects to one copy of the hub of the group matrix. This allows the software on the line card to switch to the backup link when the software detects failures on the active link.

Preferably, CPU 470 includes numerous integrated peripherals including embedded SCC channels (e.g., in-band communications) and an Ethernet controller (for example, to support communications with other system modules). In one embodiment, CPU 470 provides an onboard communications processor module (not shown) that handles time-critical aspects of the protocols supported.

Hub

One or more hubs are also provided to support communication between the group matrices and system switches in router 100. In an Ethernet communications environment, the hub's functions are carried out primarily by repeater interface controllers (RICs). Each RIC integrates the functions of a repeater, clock and data recovery unit (CDR), Manchester encoder/decoder, and transceiver. Each RIC has a set of registers that convey status information and allow a number of configuration options to be specified by the user using, for example, a microcontroller.

Shelf Processor Module

A shelf processor module provides, among other elements, a shelf processor and switch that interconnect the LAN segments from the groups and the shelf processor to a port on the shelf switch.

The shelf processor is responsible for the overall operation, management, and control of the shelf.

A network switch interconnects the lower speed inter-processor communication network segments in each shelf. In one embodiment, the network switch provides support for 10 Mbps and 100 Mbps segments.

In certain embodiments, the shelf processor is able to connect to two separate Ethernet segments. This can implement a 1:1 protection scheme that allows the shelf processor to recover from failures on the active segment by simply switching to the other segment.

System Switch

One embodiment of a system capable of interconnecting network segments in a switched configuration allows communications between shelf switches, higher-level (e.g., level-1) processors, and shelf-processors. In an Ethernet-based system, the system switch supports both 10 Mbps and 100 Mbps connections. The segments come from the shelf switching in the I/O shelf and the matrix switches, among others, and allow these elements to communicate.

Management Bay

The management bay can house, for example, the following modules:

1. Level-1processors, or system controllers, and their associated storage devices;
2. Route processors;
3. Optional group and WAN cards;
4. System Ethernet switches; and
5. Synchronization modules.

All of the above modules are fully redundant and communicate with the rest of router 100 over redundant control buses. The placement of individual modules within the rack is not addressed in this document, since there are no architectural preferences, or restrictions, on such choices.

Level-1 Processor/System Controller

A system controller (also referred to herein as a level-1 processor) provides overall control of router 100. The system controller also communicates with the system switches. The system controller includes a bus such as an all-purpose bus (APB), which in turn provides access to several bus and communications controllers. Among the controllers interfaced to the APB is a bus bridge, a peripheral interface, and an I/O interface. The I/O interface may provide functionality such as 10 Mbps/100 Mbps Ethernet communications. The I/O interface also supports peripherals such as keyboards, mice, floppy drives, parallel ports, serial ports, and the like. The bus bridge allows communications between the system controller's processor and other devices. The peripheral interface allows communications with peripherals such as hard disks. The system controller performs various functions, such as communicating with the route processor(s) to determine how the matrix should be configured, managing the router's resources, and similar duties.

APB may also be connected to a dual-channel serial communication controller (SCC), for example, which can be used to communicate with one or more remote Operations Systems (OS) using, for example, the X.25 protocol. For more OS links and higher link speeds, the user can optionally install one or more WAN Interface Modules in the management bay. Such modules, which preferably handle all real-time aspects of the OS link, including layer-2 of the OSI stack, communicate with the system controller.

Main Matrix Bay

Switching matrix 130 is based on a rearrangeably non-blocking switching matrix and can consist, for example, of switch nodes arranged in a staged array. For example, switching matrix 130 configured as a 256×256 switching matrix consists of 48 nodes arranged in an array of 16 rows by 3 columns, with each column containing one stage. All 48 nodes in the switch matrix are substantially similar. Each node is preferably a crossbar device, such as a 16×16 crossbar device that allows any of its 16 inputs to be connected to any of its 16 outputs, regardless of the crossbar's current state.

Figures 5, 5A:
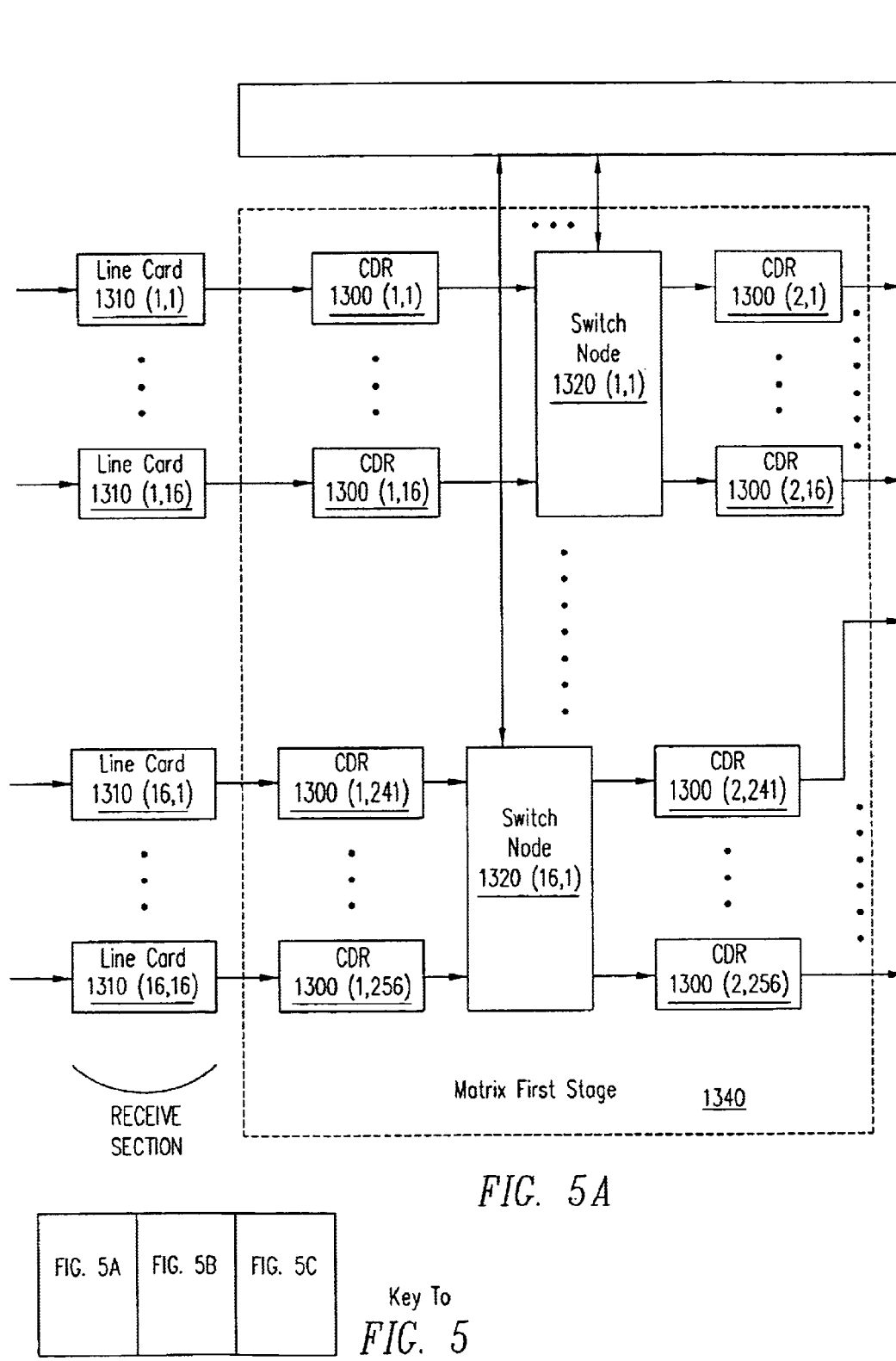
FIG. 5 illustrates a view of a switching matrix that includes clock/data recovery units and connections to the line cards.
Figure 5B:
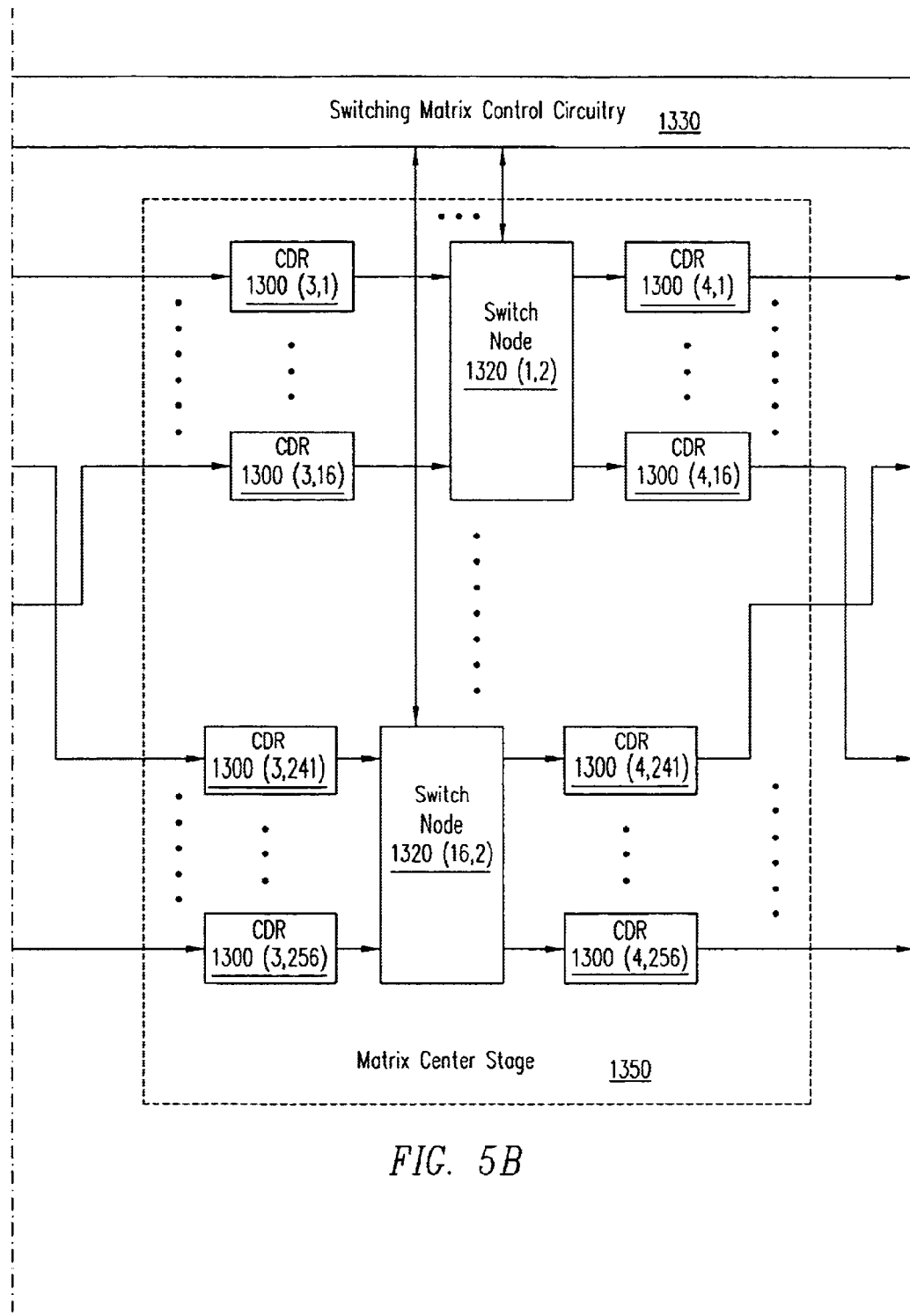
Figure 5C:
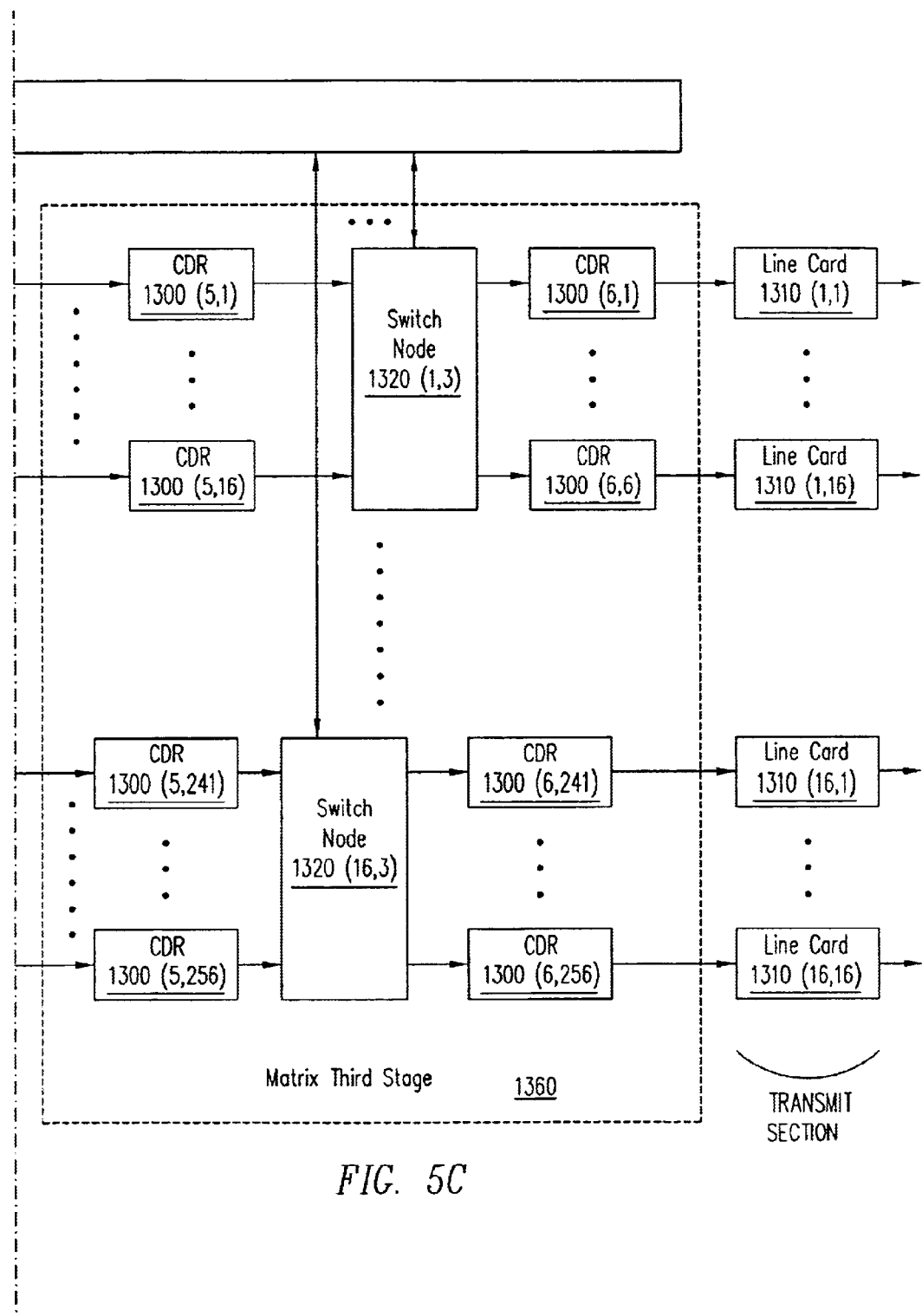

FIG. 5 illustrates a simplified view of switching matrix 130, including connections to the line cards. The depiction of switching matrix 130 in FIG. 5 shows certain other details, such as clock/data recovery units (CDRs) 500(1,1)–(6,256) and line cards 510(1,1)–(16,16). A CDR recovers clock and data information from a serial bitstream by recovering the clocking signal from the incoming bit-stream (e.g., using a phase-locked loop (PLL)), and then recovering the data using the clock thus recovered.

It will be noted that line cards 510(1,1)–(16,16) correspond loosely to line cards 220(1,1)–(N,N), as depicted in FIG. 2. It will also be noted that line cards 510(1,1)–(16,16) are each shown as being divided into a receive section and a transmit section as shown in FIG. 5, again in a fashion similar to that depicted in FIG. 2. Also depicted in FIG. 5 are switch nodes 520(1,1)–(16,3) and a switching matrix control circuit 530. More generically, the control function represented by switching matrix control circuitry 530 is depicted in FIG. 3 as matrix shelf processors 370(1)–(N) and 371(1)–(N). As previously noted, switch nodes 520(1,1)–(16,3) and their related CDRs are divided into three stages, which are depicted in FIG. 5 as matrix first stage 540, matrix center stage 550, and matrix third stage 560. It will be noted that matrix first stage 540, matrix center stage 550, and matrix third stage 560 correspond to the matrix stages represented by switch nodes 1100(1,1)–(16,1), switch nodes 1100(1,2)–(16,2), and switch nodes 1100(1,3)–(16,3). It will also be noted that the transmit side of line cards 510(1,1)–(16,16) each include CDR functionality.

SONET Frame

FIG. 6 illustrates a standard frame of the synchronous optical network (SONET) protocol, exemplified here by a SONET frame 1500. SONET frame 1500 is divided horizontally into ninety columns and is divided vertically into nine rows. The first three columns of SONET frame 1500 contain overhead bytes used for framing, communications, and other purposes. The remaining 87 columns contain data and are collectively referred to as payload. The overhead bytes include an A1 byte 1502, an A2 byte 1504, a J0/Z0 byte 1506, a B1 byte 1510, an E1 byte 1512, an F1 byte 1514, a D1 byte 1520, a D2 byte 1522, a D3 byte 1524, an H1 byte 1530, an H2 byte 1532, an H3 byte 1534, an H4 byte 1536, a B2 byte 1540, a K1 byte 1542, a K2 byte 1544, a D4 byte 1550, a D5 byte 1551, a D6 byte 1552, a D7 byte 1553, a D8 byte 1554, a D9 byte 1555, a D10 byte 1556, a D11 byte 1557, a D12 byte 1558, an S1/Z1 byte 1570, an M1/Z1 byte 1572, and an E2 byte 1574. Also included in SONET frame 1500 is payload data, represented here by payload bytes 1590–1598. It will be noted that each of payload bytes 1590–1598 includes 87*48 bytes of data for an OC-48 SONET frame (except payload bytes 1593, which includes 86*48 bytes of data (due to the existence of H4 byte 1536)).

Concatenated Payloads

For a SONET system to function as an OC-192 system, data payloads may be concatenated for transmission. Accordingly, integrated circuits, such as ASICs, are coupled to transmit the data, for example, through a router, such as a wavelength router.

Referring now to Table 1, below, a typical STS SPE payload pointer for a SONET system is shown in bits 7 through 16. The table shows bits seven through sixteen are designated either "I" for an increment or "D" for decrement. These bits are typically designated as the pointer value to indicate the offset between the pointer word and the first byte of the STS SPE. In a concatenated payload, in which more than one STS-1 is used to carry an SPE, these bits are used to carry a concatenation indicator in the second through the nth STS-1. Thus, the concatenation detection requires the detection of the pointer word value to serially pass from the nth STS-1 to the first STS-1.

TABLE 1

| H1 byte | H2 byte | H3 byte | Byte 0 of payload |
|---|---|---|---|
| 1 2 3 4 5 6 7 8 N\|N\|N\|N\|—\|—\|I\|D | 9 10 11 12 13 14 15 16 I\|D\|I\|D\|I\|D\|I\|D\| | .... Negative Stuff Byte | ... Positive Stuff Byte |

According to the GR-253 specification, an STS-N module can be formed by byte interleaving lower-level modules, such as STS-1s and STS-Ms. Those STS-Ns that are formed by byte-interleaving lower level modules must follow SONET rules dictating that before byte-interleaving to form an STS-N, the transport overhead byte positions of all constituent STS-1s and STS-Ms must be frame aligned. According to the GR-253 Specification, alignment of the STS-1s and STS-Ms is accomplished by adjusting the STS Payload Pointers to reflect the new relative positions of the STS SPEs. An example given in the GR-253 specification is to logically interleave any STS-1 inputs in sets of three consecutive STS-1s to form an STS-3 module, and then interleave those STS-3 modules and other STS-M inputs to form an STS-N. Another interleaving includes interleaving multiple STS-1 inputs to form an STS-N. However the STS is formed, the output byte sequence must follow the sequence dictated in the GR-253 Specification.

Figure 7A:
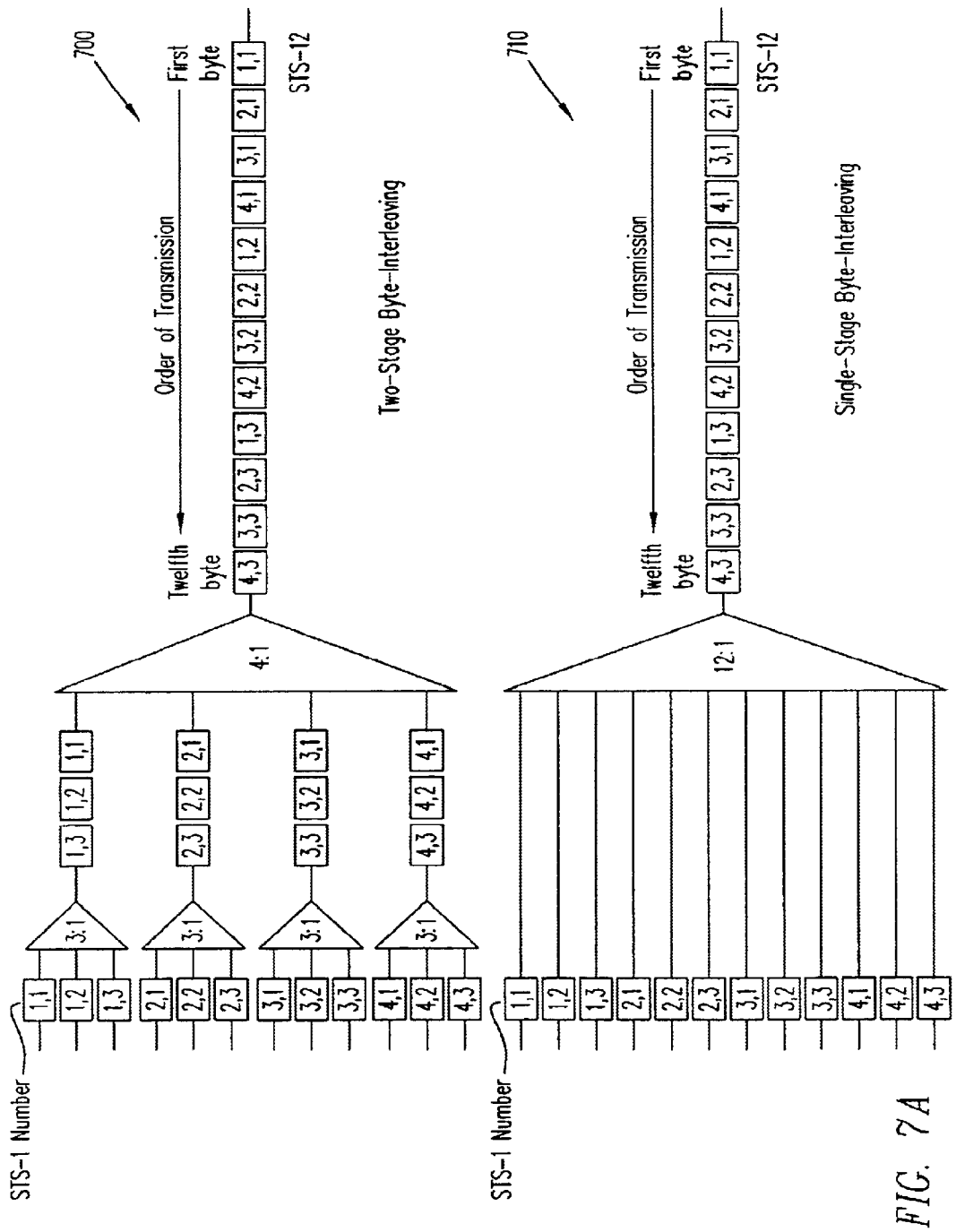
FIGS. 7A and 7B illustrate interleaved STS-N possibilities for concatenated payloads.
Figure 7B:
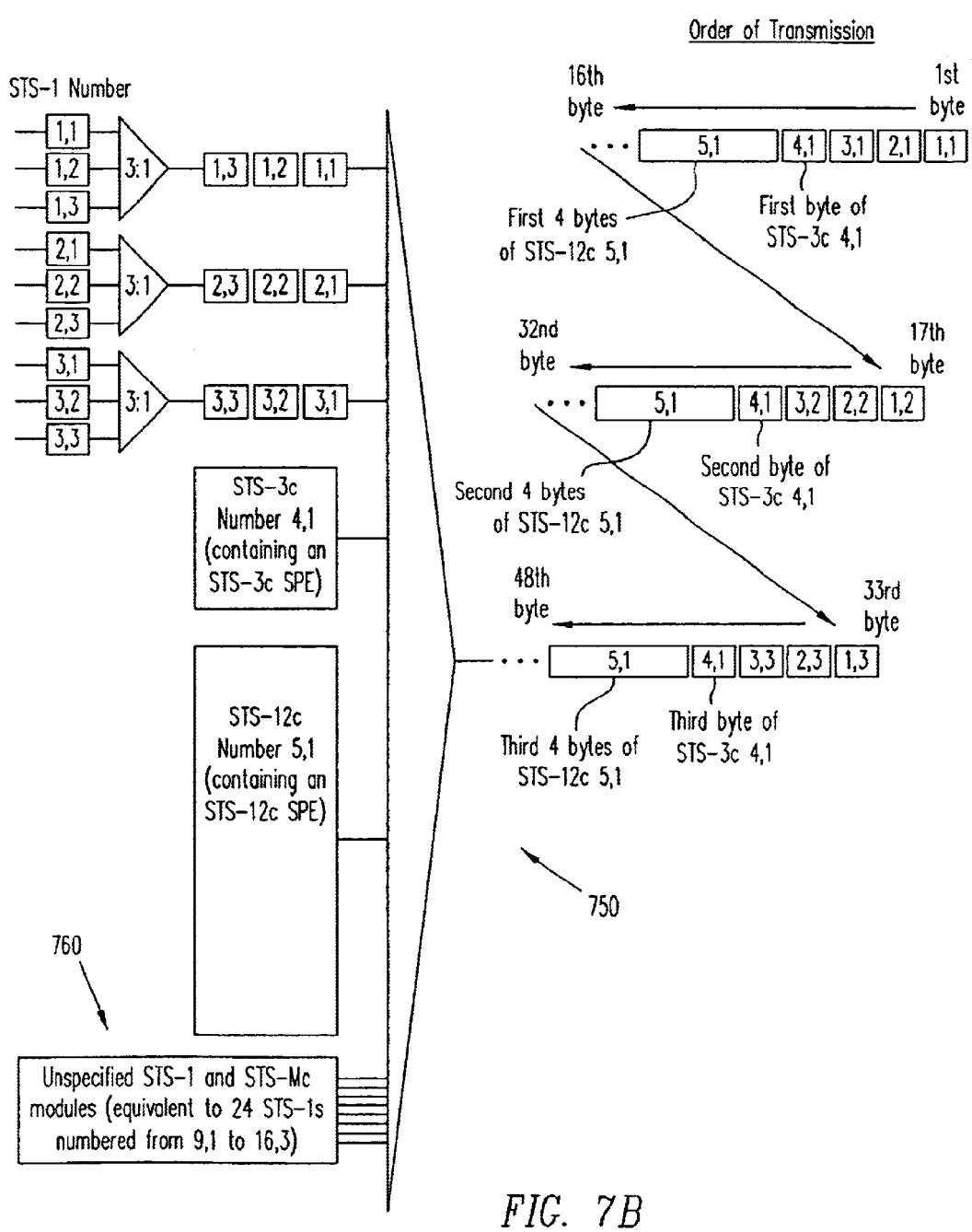

Referring to FIGS. 7A and 7B, possible byte interleaving is demonstrated in order 700, 710 and 750. As shown, the order 700 provides an interleaving of four STS-3s, order 710 provides an ordering of twelve STS-1s, and order 750 provides an ordering of three STS-3s, an STS-3c, an STS-12C, and a block 760 indicating an unspecified STS-1 and STS-Mc combination equivalent to 24 STS-1s.

When an SPE payload is concatenated, there are multiple payloads with one set of path overhead. At issue is how to hook up the STS-Ns, whether STS-1, STS-3 or STS-variable, such that the first STS-N has control over subsequent STS-Ns. In a concatenated payload, the subsequent STS-Ns are not independent. More specifically, the subsequent STS-Ns do not have independent read and write capabilities, but rely on the first STS-N to provide control. Furthermore, the control signals must reach the first STS-N within a predetermined time.

The control of the concatenated payload within an embodiment of the invention minimizes wire, routing and logic resources. Further, the combinations created are supported without additional logic required, thereby providing an efficient solution for concatenated payload control determinations. The control signals include read and write signals that transmit increment and decrement signals as well as frequency difference buffering. As those skilled in the communication art will appreciate, control signals are important for maintaining appropriate frequency levels A typical SONET communication system, for example, employs frequency difference buffering to ensure appropriate levels.

According to an embodiment of the invention, a formula for hookup of STS-1s for routing of control signals includes designating a step size, Y as an STS step size, designating a size of a total STS payload as M, and designating the Y STS step size as M divided by three. The M will be evenly divisible by three in a according to the GR-253 Specification. Further the method includes, for a first set of Y channels other than a first channel, in the multiple STS payload, designating a previous channel as a control channel, and for a second set of Y channels, designating control signals for each channel within the second set of Y channels as a channel Y positions before the given channel.

More particularly, Table 2, below, illustrates an application of the formula to an OC-48 concatenated combination of STS-1s in an STS-M. As shown, the formula applies to designate the control channel, or control STS-1. As shown, those STS-1s that do not have a designated control channel by applying the Y/3 formula are designated to follow the control of the STS-1 immediately preceding the STS-1.

TABLE 2

(STS-1, CONTROL): (1,1) (2,1) (3,2) (4,3) (5,4) (6,5) (7,6) (8,7) (9,8) (10,9) (11,10) (12,11) (13,12) (14,13) (15,14) (16,15) (17,1) (18,2) (19,3) (20,4) (21,5) (22,6) (23,7) (24,8) (25,9) (26,10) (27,11) (28,12) (29,13) (30,14) (31,15) (32,16) (33,17) (34,18) (35,19) (36,20) (37,21) (38,22) (39,23) (40,24) (41,25) (42,26) (43,27) (44,28) (45,29) (46,30) (47,31) (48,32)

As shown in Table 2, the formula applies to the connection of STS-1s in an STS-M to create an efficient routing of control signals for all types of concatenation combinations, including but not limited to the concatenation of mixing shown in FIGS. 7A and 7B. As shown in Table 2, applying the formula, the STS step size for hookup is first determined. In Table 2, the STS size of the full concatenated payload is 48. Accordingly, applying Y=M/3, the STS step size is determined by applying M=48, therefore, Y=48/3, which produces a step size of 16. Next, applying the rule that the first STS-1 channel controls itself, the rule applies to each subsequent STS1 to provide a control from the next previous STS-1, until the step size 16 is complete. Thereafter, the control for the next STS-1, is the next STS-1, i.e., number 17, is designated as the first STS-1, and thereafter, each following STS-1 receives control from the STS-1 Y positions prior thereto.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method for directing control of communication signals in a concatenated payload in a communication circuit, the method comprising:

receiving a multiplex order of the concatenated payload in M communication signals;

dividing the M communication signals by three to determine a number Y;

determining the control of the M communication signals by:

designating a first signal of the M communication signals as a control signal;

designating a second signal through a Yth signal of the M communication signals as being controlled by the immediately preceding signal thereto; and designating each Y+1th signal of the M signals through the Mth communication signal as being controlled by a signal Y positions prior thereto.

2. The method of claim 1 wherein the communication signals are synchronous transport signals.

3. The method of claim 1 wherein the M communication signals are in a multiplexed order.

4. The method of claim 1 wherein the first signal of the M communication signals is a control signal read and write capability for frequency difference buffering using increment/decrement technology.

5. The method of claim 1 wherein M is one of 1, 24, 48, 96, 192, 768, and 3072.

6. The method of claim 1 wherein M is a multiple of three and two and is further greater than or equal to twelve.

7. The method of claim 1 wherein the communication circuit is disposed on a router.

8. The method of claim 1 wherein the communication circuit is disposed on an application specific integrated circuit (ASIC).

9. The method of claim 1 wherein the concatenated payload includes one or more of at least one of an STS-1, an STS-3, an STS-48, an STS-12, an STS-24, and an STS-X, wherein X is a multiple of three.

10. A communication circuit for directing control of communication signals in a concatenated payload, the apparatus comprising:

a module configured to receive a multiplex order of the concatenated payload in M communication signals;

a module configured to divide the M communication signals by three to determine a number Y;

a module configured to control of the M communication signals by:

designating a first signal of the M communication signals as a control signal;

designating a second signal through a Yth signal of the M communication signals as being controlled by the immediately preceding signal thereto; and designating each Y+1th signal of the M signals through the Mth communication signal as being controlled by a signal Y positions prior thereto.

11. The communication circuit of claim 10 wherein the communication signals are synchronous transport signals.

12. The communication circuit of claim 10 wherein the M communication signals are in a multiplexed order.

13. The communication circuit of claim 10 wherein the first signal of the M communication signals is a control signal read and write capability for frequency difference buffering using increment/decrement technology.

14. The communication circuit of claim 10 wherein M is one of 1, 24, 48, 96, 192, 768, and 3072.

15. The communication circuit of claim 10 wherein M is a multiple of three and two and is further greater than or equal to twelve.

16. The communication circuit of claim 10 wherein the communication circuit is disposed on a router.

17. The communication circuit of claim 10 wherein the communication circuit is an application specific integrated circuit (ASIC).

18. The communication circuit of claim 10 wherein the concatenated payload includes one or more of at least one of an STS-1, an STS-3, an STS-48, an STS-12, an STS-24, and an STS-X, wherein X is a multiple of three.

19. A computer program product for directing control of communication signals in a concatenated payload, the computer program product comprising:

signal bearing media bearing programming adapted to:

receive a multiplex order of the concatenated payload in M communication signals;

divide the M communication signals by three to determine a number Y;

control the M communication signals by:

designating a first signal of the M communication signals as a control signal;

designating a second signal through a Yth signal of the M communication signals as being controlled by the immediately preceding signal thereto; and designating each Y+1th signal of the M signals through the Mth communication signal as being controlled by a signal Y positions prior thereto.

20. The computer program product of claim 19, wherein said signal bearing media is transmission media.

21. The computer program product of claim 19, wherein said signal bearing media is recordable media.

22. A communication system for directing control of communication signals in a concatenated payload in a communication circuit, the communication system comprising:

means for receiving a multiplex order of the concatenated payload in M communication signals;

means for dividing the M communication signals by three to determine a number Y;

means for determining the control of the M communication signals implemented with:

means for designating a first signal of the M communication signals as a control signal;

means for designating a second signal through a Yth signal of the M communication signals as being controlled by the immediately preceding signal thereto; and means for designating each Y+1th signal of the M signals through the Mth communication signal as being controlled by a signal Y positions prior thereto.

23. The communication system of claim 22 wherein the communication signals are synchronous transport signals.

24. The communication system of claim 22 wherein the M communication signals are in a multiplexed order.

25. The communication system of claim 22 wherein the first signal of the M communication signals is a control signal read and write capability for frequency difference buffering using increment/decrement technology.

26. The communication system of claim 22 wherein M is one of 1, 24, 48, 96, 192, 768, and 3072.

27. The communication system of claim 22 wherein M is a multiple of three and two and is further greater than or equal to twelve.

28. The communication system of claim 22 wherein the communication circuit is disposed on a router.

29. The communication system of claim 22 wherein the communication circuit is disposed on an application specific integrated circuit (ASIC).

30. The communication system of claim 22 wherein the concatenated payload includes one or more of at least one of an STS-1, an STS-3, an STS-48, an STS-12, an STS-24, and an STS-X, wherein X is a multiple of three.

* * * * *